(12) United States Patent
Park et al.

(10) Patent No.: US 8,434,383 B2
(45) Date of Patent: May 7, 2013

(54) TRANSMISSION SHIFTING APPARATUS FOR VEHICLE

(75) Inventors: Hangil Park, Hwaseong-si (KR); Changhyun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 339 days.

(21) Appl. No.: 12/886,293

(22) Filed: Sep. 20, 2010

(65) Prior Publication Data

US 2011/0132124 A1    Jun. 9, 2011

(30) Foreign Application Priority Data

Dec. 4, 2009  (KR) .................. 10-2009-0119747

(51) Int. Cl.
- B60K 17/04    (2006.01)
- B60K 17/12    (2006.01)
- B60K 20/00    (2006.01)
- G05G 9/00     (2006.01)

(52) U.S. Cl.
USPC .................................... 74/473.18; 74/473.12

(58) Field of Classification Search ............... 74/473.12, 74/473.18, 473.21, 473.22, 473.23, 473.3, 74/473.33, 335, 336 R; 701/51, 52
See application file for complete search history.

(56) References Cited

U.S. PATENT DOCUMENTS

| | | | |
|---|---|---|---|
| 5,056,376 A | 10/1991 | Moroto et al. | |
| 6,089,118 A * | 7/2000 | Ishii et al. ................. | 74/473.18 |
| 6,148,686 A * | 11/2000 | Kataumi ..................... | 74/473.18 |
| 6,325,196 B1 * | 12/2001 | Beattie et al. .............. | 192/220.4 |
| 6,474,186 B1 | 11/2002 | Vollmar | |
| 7,750,624 B2 * | 7/2010 | Heo et al. .................. | 324/207.23 |
| 2003/0172762 A1 * | 9/2003 | Ehrmaier et al. ........... | 74/473.33 |
| 2004/0216547 A1 * | 11/2004 | Shiomi et al. ................. | 74/335 |
| 2004/0226801 A1 * | 11/2004 | De Jonge et al. ........... | 192/220.7 |
| 2005/0056109 A1 * | 3/2005 | Kim ............................. | 74/473.3 |
| 2006/0053930 A1 * | 3/2006 | Morita et al. ................ | 74/473.18 |
| 2008/0113848 A1 * | 5/2008 | Inoue et al. ..................... | 477/98 |
| 2009/0152070 A1 | 6/2009 | Nakamura et al. | |

FOREIGN PATENT DOCUMENTS

| | | |
|---|---|---|
| JP | 3-153958 A | 7/1991 |
| JP | 5-223151 A | 8/1993 |
| JP | 5-223156 A | 8/1993 |
| JP | 11-157353 A | 6/1999 |
| JP | 2001-304395 A | 10/2001 |
| JP | 2001-304396 A | 10/2001 |
| JP | 2003513207 A | 4/2003 |
| JP | 2006-7885 A | 1/2006 |
| JP | 2009-144898 A | 7/2009 |
| JP | 2009-168223 A | 7/2009 |
| WO | WO 2008/011946 A1 | 1/2008 |

* cited by examiner

*Primary Examiner* — Troy Chambers
*Assistant Examiner* — Jake Cook
(74) *Attorney, Agent, or Firm* — Morgan, Lewis & Bockius LLP

(57) ABSTRACT

A transmission shifting apparatus of a vehicle, may include a shifter movably installed along at least two straight paths which meet each other at one point, respectively, wherein at least two fixed points are arranged adjacent each other in at least one of straight paths, in which the shifter maintains a position thereof unless an external force is applied thereto, wherein the straight path having the at least two fixed points has a structure extending outwardly to both sides of the at least two fixed points, and wherein one of the at least two fixed points in the straight path is formed to meet the other straight path of the at least two straight paths.

36 Claims, 22 Drawing Sheets

——— : STABLE INTERVAL

- - - - - - : UNSTABLE INTERVAL

——————— : STABLE INTERVAL

---------- : UNSTABLE INTERVAL

WHEN R → D SHIFT

WHEN R → P SHIFT

WHEN P → R SHIFT

WHEN N → R SHIFT

WHEN D → N SHIFT

WHEN D → R SHIFT

TRANSMISSION SHIFTING APPARATUS FOR VEHICLE

CROSS-REFERENCE TO RELATED APPLICATIONS

The present application claims priority to Korean Patent Application Number 10-2009-0119747 filed Dec. 4, 2009, the entire contents of which application are incorporated herein for all purposes by this reference.

BACKGROUND OF THE INVENTION

1. Field of the Invention

The present invention relates to a shifting apparatus of a transmission mounted on a vehicle, and in particular to a shifting apparatus of a transmission usable in a vehicle on which a shifting device in the way of a shift-by-wire is mounted, wherein the shifting device is free from a mechanical coupling for transferring a shifting force between a transmission and the shifting apparatus.

2. Description of Related Art

A shift-by-wire shifting device is a device that does not transfer a driver's shifting power to a transmission through a mechanical cable as in the related art, but receives an electric signal according to a driver's shifting operation of a transmission and control a transmission with its electric signal.

In order to realize the shift-by-wire shifting device as mentioned above, it makes it possible to convert a power of a driver's shifting operation into an electric signal properly and to receive the electric signal, thereby having to be able to not only be used in the way similar to mechanical shift lever devices of the related art, but also automatically prohibit shifting operations limited by regulations or incurring a dangerous situation and provide convenient usability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a transmission shifting apparatus for a vehicle, which makes it possible not only to be similar to mechanical shift levers of the related art and provide convenient usability, but also to prohibit shifting operations limited by regulations or incurring a dangerous situation, so that safe and convenient shifting operations can be performed.

An aspect of the present invention provides a transmission shifting apparatus of a vehicle including a shifter movably installed along at least two straight paths which meet at one point each other, respectively, wherein at least two fixed points are arranged adjacent each other in at least one of straight paths, in which the shifter maintains a position thereof unless an external force may be applied thereto, wherein the straight path having the at least two fixed points has a structure extending outward both sides of the at least two fixed points, and wherein one of the at least two fixed points in the straight path may be formed to meet the other straight path of the at least two straight paths.

Another aspect of the present invention provides a transmission shifting apparatus of a vehicle including a shifter movably installed along at least two straight paths which meet each other at one point, respectively, a sensor for sensing a changing location of the shifter moved along the at least two straight paths, and a controller for receiving an input of the sensor and outputting a shifting signal which control a transmission according to the changing operation of shifter, wherein at least two fixed points are arranged adjacent each other in at least one of straight paths, in which shifter maintains a position thereof unless an external force may be applied thereto, wherein the straight path having the at least two fixed points has a structure extending outward both sides of the at least two fixed points, wherein one of the at least two fixed points in the straight path may be formed to meet the other straight path of the at least two straight paths, and wherein the straight path having the at least two fixed points has temporary points in which the shifter moves outward both sides of the at least two fixed points by an external force respectively, and automatically return to one fixed point of the two fixed points, the one fixed point of the two fixed points being adjacent to the corresponding temporary point.

The present invention makes it possible not only to be similar to shift levers of the related art and provide convenient usability, but also to prohibit shifting operations limited by regulations or incurring a dangerous situation, so that safe and convenient shifting operations can be performed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
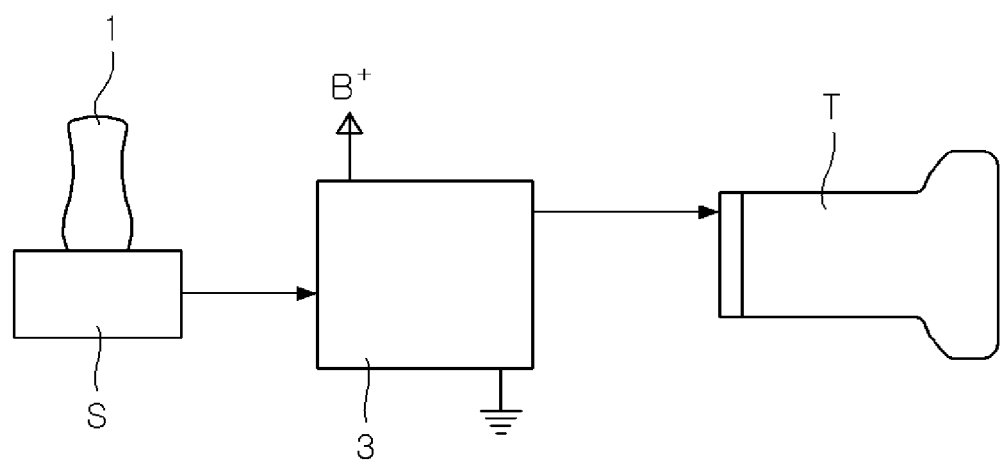
FIG. 1 is a view showing a conceptional constitution of a transmission shifting apparatus for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIG. 1, an embodiment of the present invention includes a shifter 1 movably installed along at least two straight paths L which meet at one point for mutual respectively, a sensor S for sensing a changing location of shifter 1 moved along straight paths L, and a controller 3 for receiving input from sensor S and outputting a shifting signal which control a transmission T by operating shifter 1.

Where, what straight paths L meet at one point for mutual respectively means that two straight paths L have an intersecting point while the two straight paths L are not parallel to each other but are inclined in a certain angle.

Figure 2:
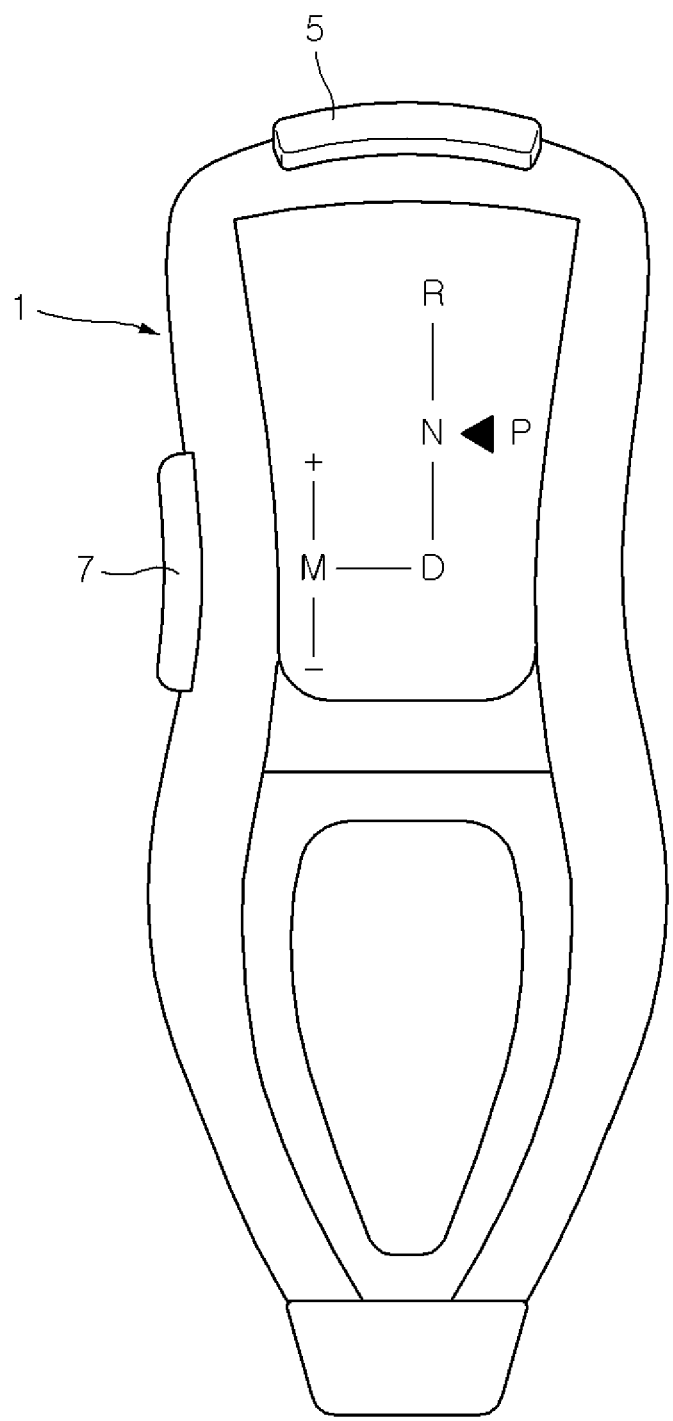
FIG. 2 is a view showing an embodiment of a shifter of the present invention.

In the exemplary embodiment, as shown in FIG. 2, shifter 1 is constructed to have a shape similar to shift levers of the related art, and move along straight paths L with a certain point spaced from the pivot point toward an upper portion closely tracing a straight line when pivoting about a pivot point in a lower portion not shown.

Of course, shifter 1 may have not a constitution of a lever but the same constitution as a slider, etc. moving along straight line L actually.

Figure 3:
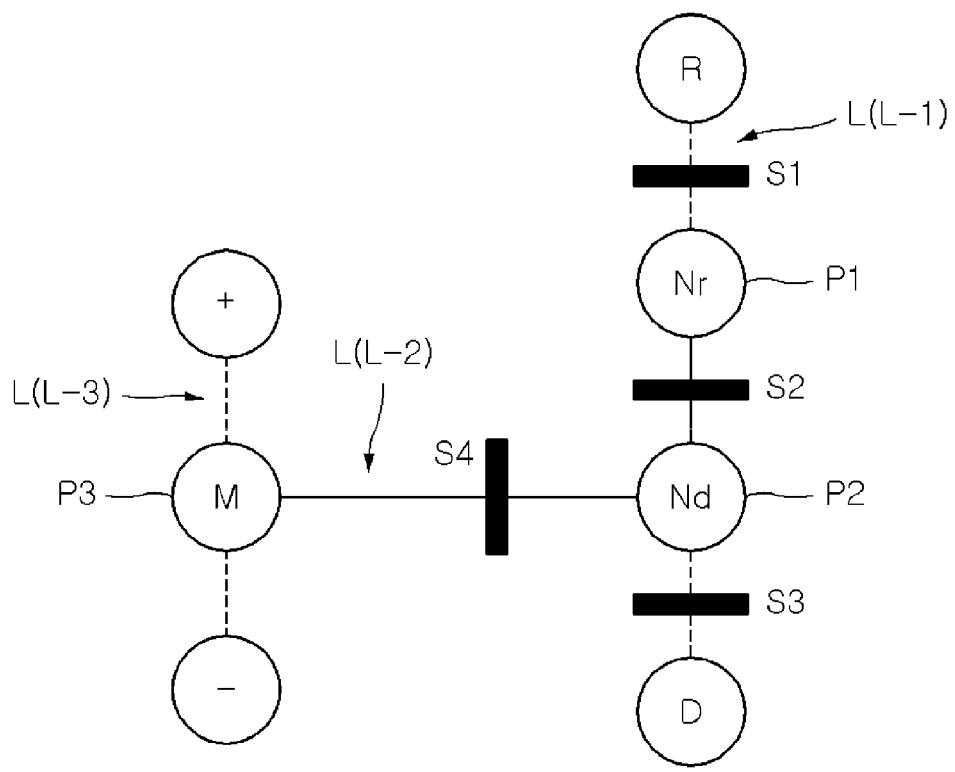
FIG. 3 is a view showing an embodiment of substantial paths, that is, shifting patterns in which a shifter of a transmission shifting apparatus for a vehicle according to the present invention moves.

Referring to FIG. 3, two fixed points are arranged adjacent each other in one of straight paths L, in which shifter 1 can maintain its position unless an external force is applied. Straight path L having the two fixed points has a structure extending outward both sides of the two fixed points, and one of the two fixed points is formed to meet other straight path L. Also, straight path L having the two fixed points has temporary points in which shifter 1 is moved outward both sides of the two fixed points by an external force respectively, and automatically returned to an adjacent point of the two fixed points.

Where, what two fixed points are arranged adjacent each other means that there is not a position of shifter 1 between the two fixed points which controller 3 acknowledge as a meaningful position, so that controller 3 is adapted to recognize that shifter 1 is moved to the other fixed point when being moved from a certain point between the two fixed points to other point.

An elastic element is equipped between the temporary points and the fixed points mechanically, so that shifter 1 is constructed to return from the temporary points to the fixed points automatically.

For reference, in FIG. 3, a stable interval as an interval between the fixed points is an interval that shifter 1 is not moved arbitrarily but maintained at the fixed point stably, an unstable interval as an interval between the fixed point and the temporary point is an interval that shifter 1 located at the temporary point is moved to an adjacent fixed point automatically when user's external force is removed.

When the two fixed points are divided into a first fixed point P1 and a second fixed point P2, and straight path L having the two fixed points and other straight path L intersected with the same are divided into a first path L-1 and a second path L-2 respectively, second path L-2 meets first path L-1 at second fixed point P2, and meets another straight path L, which is a third path L-3, and the point where second path L-2 meets third path L-3 is third fixed point P3 where shifter 1 can maintain its position unless an external force is applied.

Both ends of second path L-2 may include second fixed point P2 and third fixed point P3, second fixed point P2 and third fixed point P3 are arranged adjacent each other, and third path L-3 has temporary points in which shifter 1 is moved to both sides about third fixed point P3 by an external force and returned automatically to third fixed point P3.

Where, the temporary point outside first fixed point P1 of first fixed point P1 and second fixed point P2 is a R temporary point R for selecting R range, the temporary point outside second fixed point P2 of first fixed point P1 and second fixed point P2 is a D temporary point D for selecting D range, first fixed point P1 and second fixed point P2 are an NR fixed point Nr and an ND fixed point Nd for selecting N range, respectively, third fixed point P3 is a M fixed point M for selecting a neutral state of manual mode, and temporary points in both sides of M fixed point M are a +temporary point and a − temporary point.

The embodiment further includes a P actuator 5 for selecting P range by a separate shifting operation when shifter 1 is located at NR fixed point Nr or ND fixed point Nd, and controller 3 is constructed to receive a signal according to shifting operation of P actuator 5.

In particular, in the embodiment, as shown FIG. 2, P actuator 5 has a structure of a P shifting button provided in shifter 1. Of course, P actuator 5 may have a switch structure of another type besides a structure of button, and is provided not in shifter 1 but in another position near shifter 1.

Also, shifter 1 further includes a safety switch 7 for receiving a user's input separately except for moving shifter 1, and controller 3 is constructed to receive a signal according to handling of safety switch 7.

Of course, safety switch 7 also may have a structure of button as shown, or be implemented as a switch of a lever or another structure. Safety switch 7 does not necessarily have to be located in shifter 1.

Referring to FIG. 3, a first barrier S1, a second barrier S2, a third barrier S3 and a fourth barrier S4 are provided between R temporary point R and NR fixed point Nr, between NR fixed point Nr and ND fixed point Nd, between ND fixed point Nd and D temporary point D, and between ND fixed point Nd and M fixed point M, respectively, so as to selectively prevent shifter 1 from moving from current position to a fixed point or an temporary point, and controller 3 is constructed to control first barrier S1, second barrier S2, third barrier S3 and fourth barrier S4.

That is, controller 3 selectively controls first barrier S1 to fourth barrier S4 according to a position and a shifting state of shifter 1, and limits the movement of shifter 1 within a proper range, thereby controlling so as to prohibit shifting operations limited by regulations and prevent dangerous shifting operations be performing.

Figure 4:
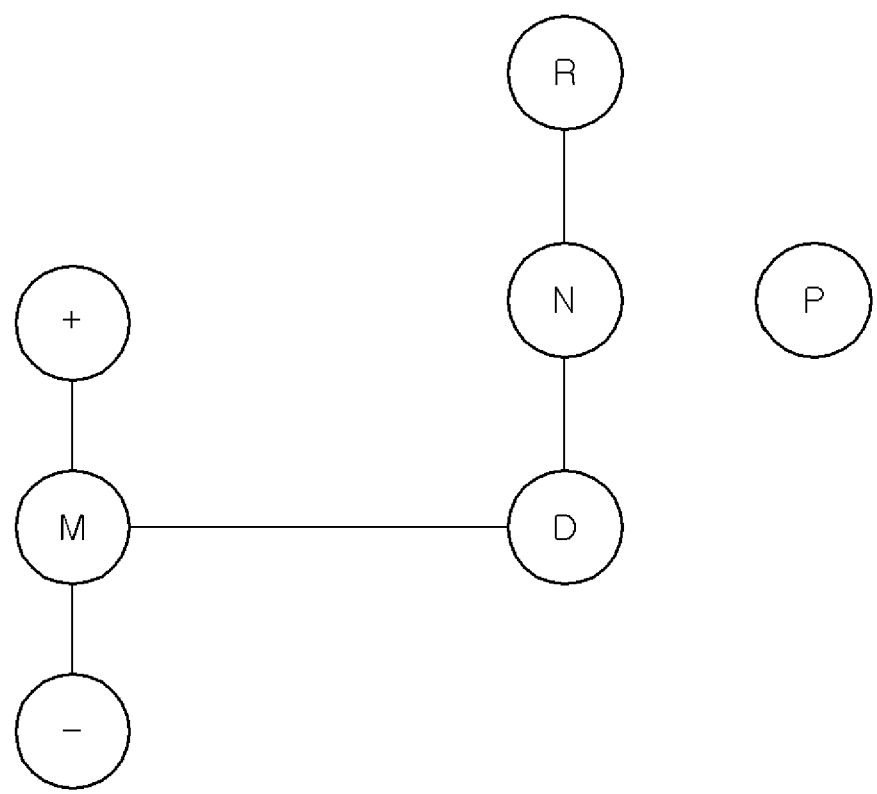
FIG. 4 is a view showing virtual shifting patterns for making user feel when the shifter moving in the shifting patterns as shown FIG. 3.

Also, controller 3 handles first barrier S1 to fourth barrier S4 properly, so that user feels for handling of shifter 1 like the same situation as a mechanical shifting device as shown in FIG. 4.

For example, when it is judged that shifter 1 is in N range selection with located at NR fixed point Nr, third barrier S3 restrains shifter 1 from moving, and makes it possible to for shifter 1 to move not to D temporary point D only but to ND fixed point Nd, thereby, in FIG. 3, actually shifter 1 is moved from NR fixed point Nr to ND fixed point Nd, but user feels like shifting from N range to D range as shown FIG. 4.

Controller 3 is constructed to judge that both a state in which shifter 1 is located at NR fixed point Nr and a state in which shifter 1 is located at ND fixed point Nd are in a state of P range selection, respectively, and then output a shifting signal of P range, when controller 3 receives a signal by an operation of P actuator 5 with shifter 1 located at NR fixed point Nr or ND fixed point Nd.

That is, when user operates only P actuator 5 with shifter 1 being located at NR fixed point Nr or ND fixed point Nd, controller 3 judges a shifting state of P range as it stands without a movement of shifter 1, outputs a accompanying P range shifting signal to a transmission, and make transmission T to be in a state of P range.

Also, controller 3 is constructed to recognize that a state of shifter 1 located at NR fixed point Nr is a state of N or R range selection besides P range, and that a state of shifter 1 located at ND fixed point Nd is a state of N or D range selection besides P range.

That is, controller 3 may recognize that a state of shifter 1 located in NR fixed point Nr is a state of P range selection, a state of N range selection, or a state of R range selection, and that a state of shifter 1 located in ND fixed point Nd is a state of P range selection, a state of N range selection, or a state of D range selection.

Hereinafter, more specifically explain the detailed through FIGS. 5 to 22.

Figure 5:
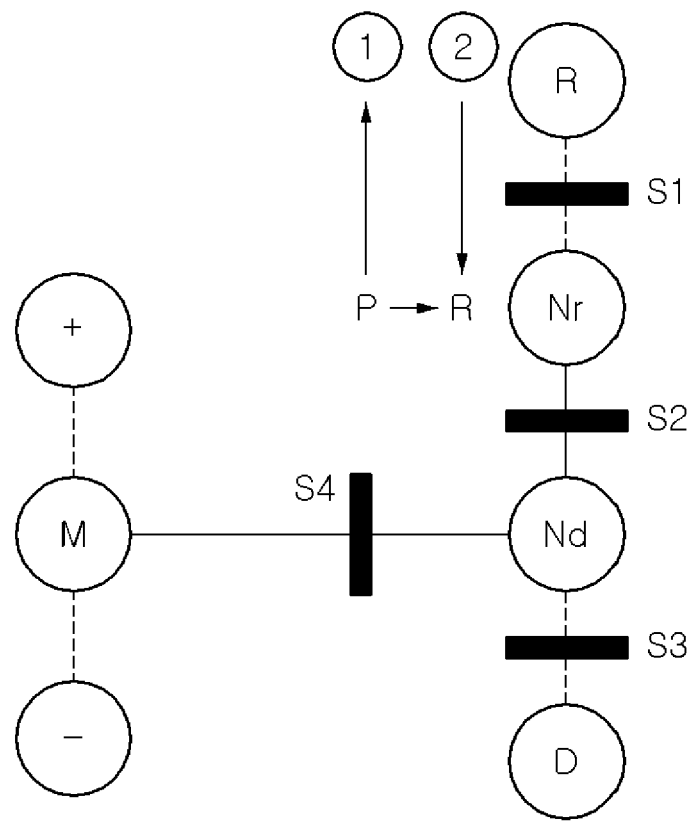
FIGS. 5 to 13 are a view showing cases that shifter is shifted from one state of a P range selection state, an N range selection state and an R range selection state at NR fixed point Nr to the other state, respectively.

Referring to FIG. 5, controller 3 is constructed to judge as a R range shifting operation, with shifter 1 being in a state of P range selection at NR fixed point Nr, thereafter when receiving as a signal of sensor S that shifter 1 in turn moves along a straight moving path shifted by user from NR fixed point Nr to R temporary point R and a straight moving path returning to NR fixed point Nr automatically after user's external force being removed at R temporary point R, and to output a signal of R range shifting.

That is, if a driver pushes shifter 1 to R temporary point R and then release it when shifter 1 being in a state of P range selection at NR fixed point Nr, shifter 1 is moved to R temporary point R and then elastically returned to NR fixed point Nr again. Controller 3 is input this movement of shifter 1 through sensor S, then interprets and judges that a driver shifts to R range, and outputs a signal of R range shifting, thereby accomplishing R range shifting operation at transmission substantially.

Figure 6:
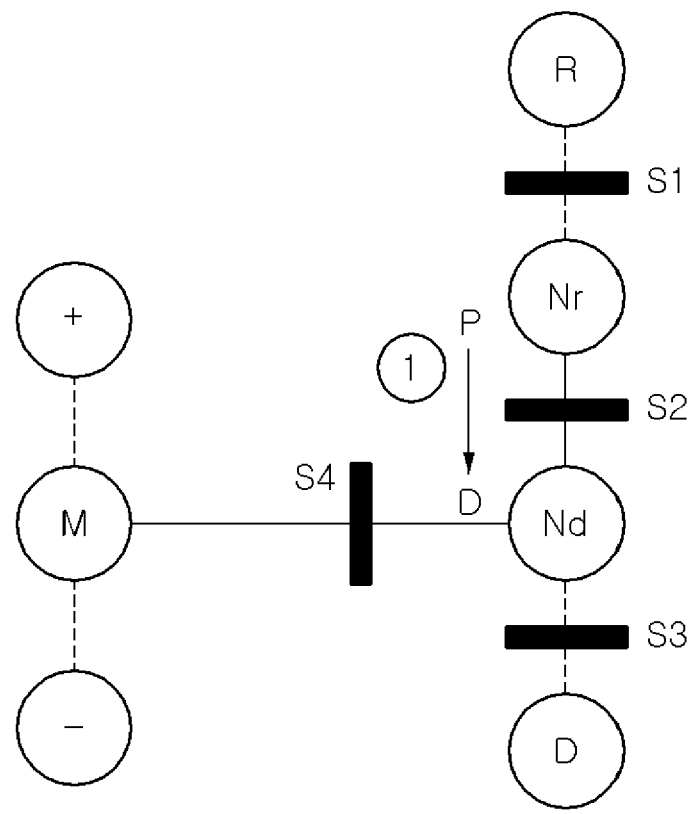

Referring to FIG. 6, controller 3 is constructed to judge as a D range shifting operation, with shifter 1 being in a state of P range selection at NR fixed point Nr, thereafter when receiving as a signal of sensor S that shifter 1 moves along a straight moving path shifted by user from NR fixed point Nr to ND fixed point Nd, and to output a signal of D range shifting.

Figure 7:
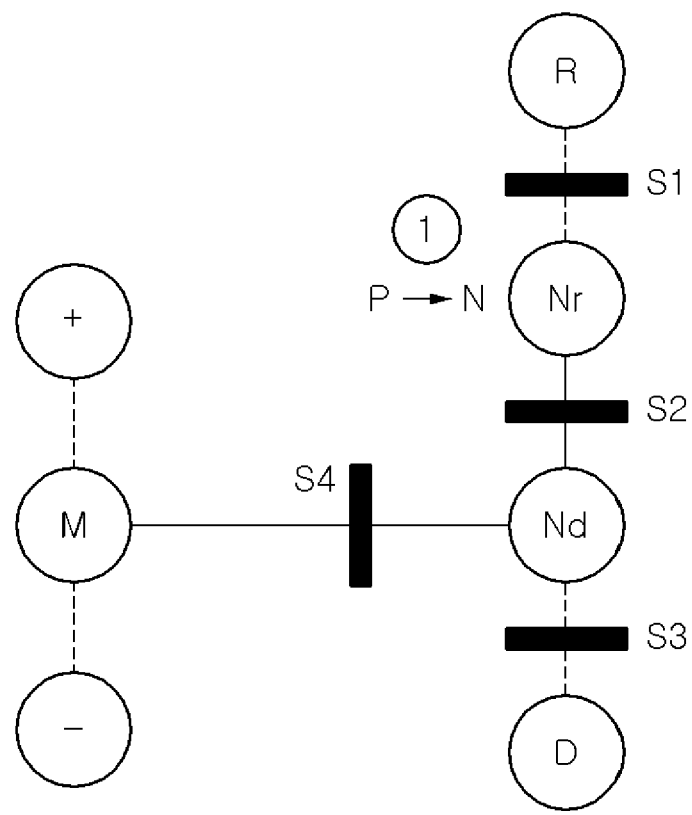

Referring to FIG. 7, controller 3 is constructed to judge as an N range shifting operation, with shifter 1 being in a state of P range selection at NR fixed point Nr, thereafter when receiving as a signal of sensor S that safety switch 7 is operated, to recognize as a state of N range selecting a state in which shifter 1 is maintained at NR fixed point Nr and to output a signal of N range shifting.

That is, with P range selection being recognized by controller 3 in a state of shifter 1 at NR fixed point Nr, when a driver operates a safety switch 7, that is interpreted as shifting to N range, thereby only recognizing a state that controller 3 converts into N range selection with shifter 1 being located at NR fixed point Nr as it is, accordingly controller 3 outputs a signal of N range shifting and control to make transmission T to be N range.

Figure 8:
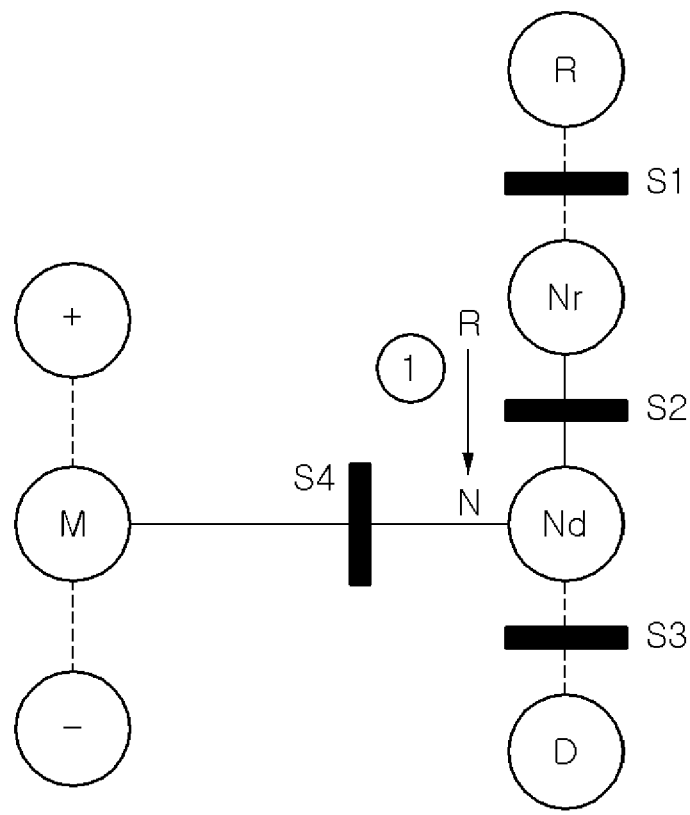

Referring to FIG. 8, controller 3 is constructed to judge as an N range shifting operation, with shifter 1 being in a state of R range selection at NR fixed point Nr, thereafter when receiving as a signal of sensor S that shifter 1 moves along a straight moving path shifted by user from NR fixed point Nr to ND fixed point Nd, and to output a signal of N range shifting.

Figure 9:
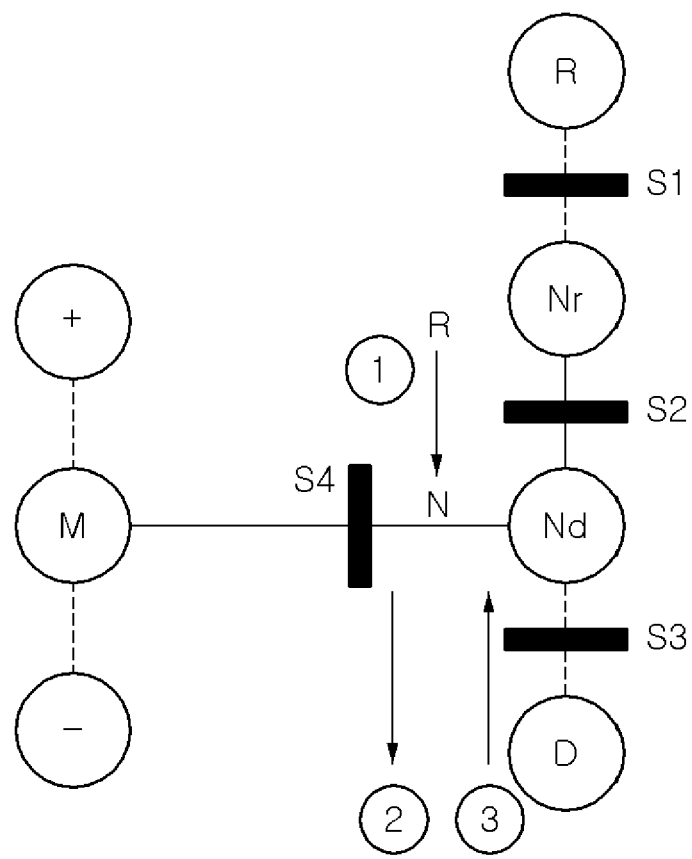

Referring to FIG. 9, controller 3 is constructed to judge as a D range shifting operation, with shifter 1 being in a state of R range selection at NR fixed point Nr, thereafter when receiving as a signal of sensor S that shifter 1 in turn moves along a straight moving path shifted by user from NR fixed point Nr to ND fixed point Nd, a straight moving path shifted by user from the ND fixed point Nd to the D temporary point D, and a straight moving path returning to ND fixed point Nd automatically after user's external force being removed at D temporary point D, and to output a signal of D range shifting.

That is, when a driver want to shift to D range with shifter 1 being in a state of R range selection at NR fixed point Nr, the driver moves shifter 1 from NR fixed point Nr to ND fixed point Nd, and when subsequently pulling and releasing shifter 1 to D temporary point D, shifter 1 is returned to ND fixed point Nd. Controller 3 judges this movement of shifter 1 as a D range shifting operation by a signal from sensor S.

As described above, the reason D range shifting operation is accomplished only if shifter 1 is pushed and released from R range selection through ND fixed point Nd to D temporary point D at NR fixed point Nr, is to follow a regulation that N range is sure to exist between a forward range, D range and a reverse range, R range.

Figure 10:
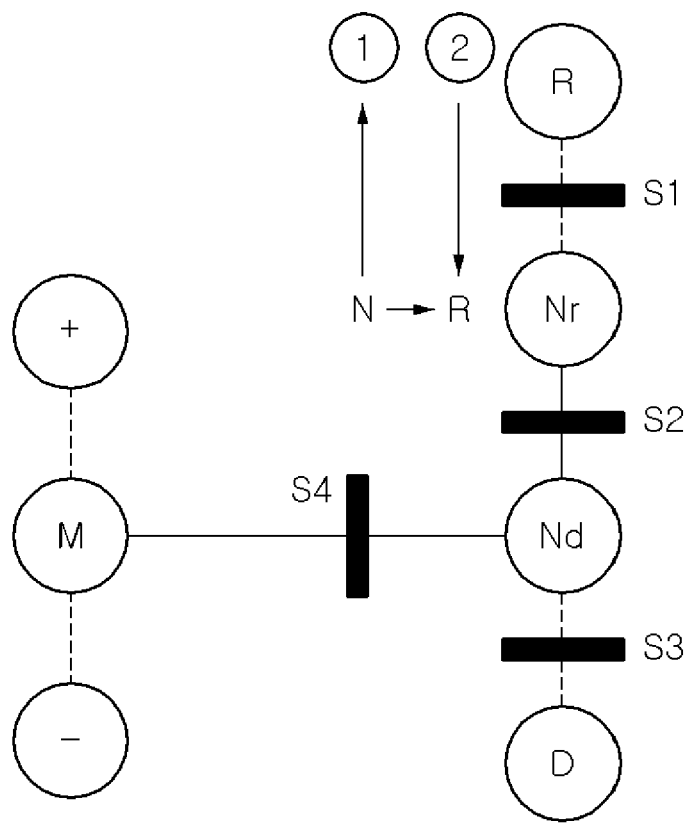

Referring to FIG. 10, controller 3 is constructed to judge as a R range shifting operation, with shifter 1 being in a state of N range selection at NR fixed point Nr, thereafter when receiving as a signal of sensor S that shifter 1 in turn moves along a straight moving path shifted by user from NR fixed point Nr to R temporary point R and a straight moving path returning to NR fixed point Nr automatically after user's external force being removed at R temporary point R, and to output a signal of R range shifting.

Figure 11:
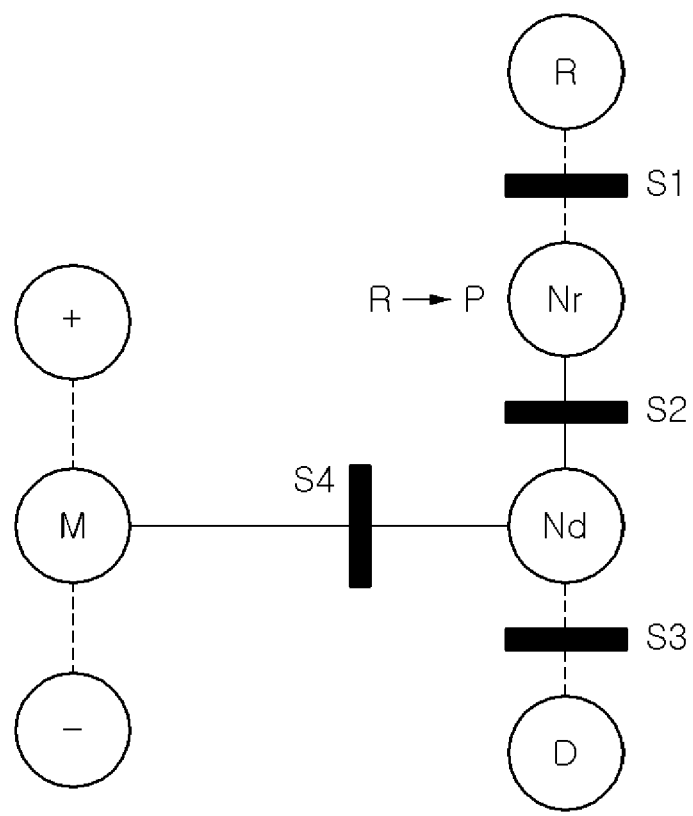

Referring to FIG. 11, controller 3 is constructed to judge as a P range shifting operation, with shifter 1 being in a state of R range selection at NR fixed point Nr, thereafter when receiving a signal of sensor S with respect to an operation of P actuator 5, to recognize as a state of P range selecting a state in which shifter 1 is maintained at NR fixed point Nr, and to output a signal of P range shifting.

Figure 12:
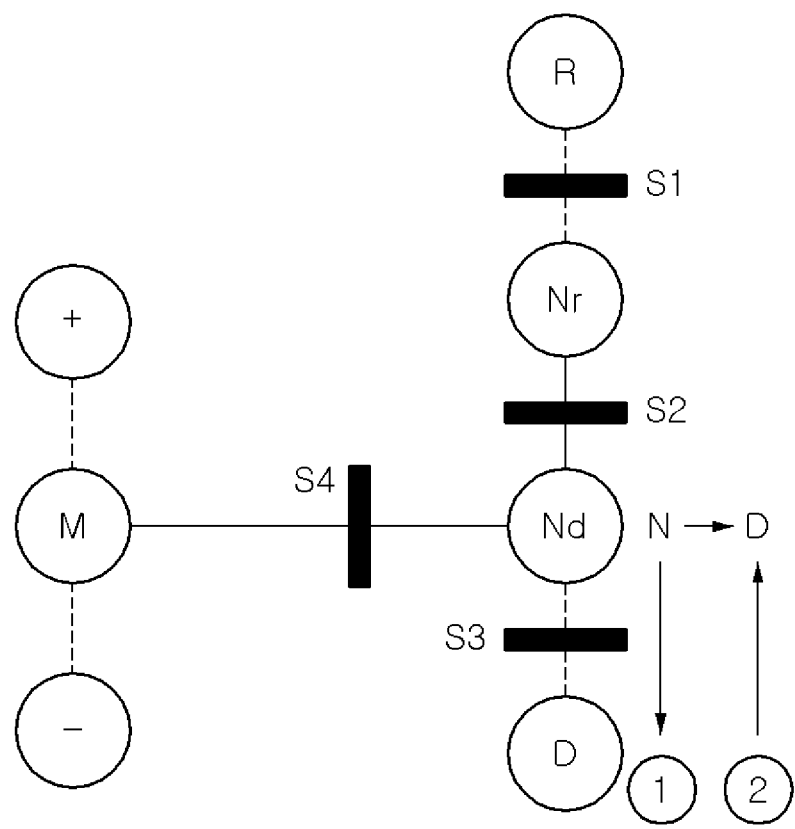

Referring to FIG. 12, controller 3 is constructed to judge as a D range shifting operation, with shifter 1 being in a state of N range selection at NR fixed point Nr, thereafter when receiving as a signal of sensor S that shifter 1 in turn moves along a straight moving path shifted by user from NR fixed point Nr to ND fixed point Nd, a straight moving path shifted by user from ND fixed point Nd to D temporary point D, and a straight moving path returning to ND fixed point Nd automatically after user's external force being removed at D temporary point D, and to output a signal of D range shifting.

Figure 13:
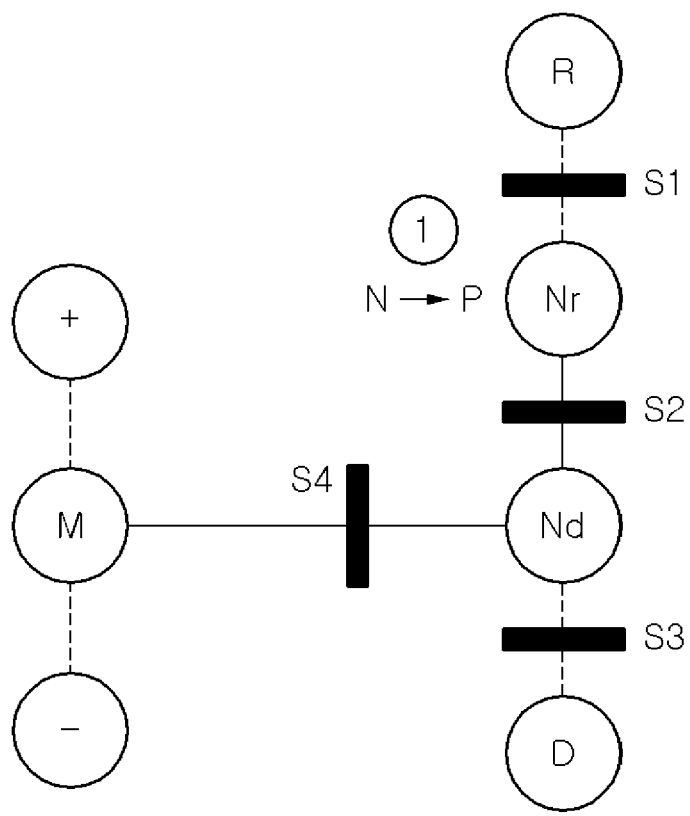

Referring to FIG. 13, controller 3 is constructed to judge as a P range shifting operation, with shifter 1 being in a state of N range selection at NR fixed point Nr, thereafter when receiving a signal of sensor S with respect to an operation of P actuator 5, to recognize as a state of P range selecting a state in which shifter 1 is maintained at NR fixed point Nr, and to output a signal of P range shifting.

For reference, FIGS. 5 to 13 as described above are cases that shifter 1 is shifted from one state of P range selection, N range selection and R range selection at NR fixed point Nr to the other state, FIGS. 14 to 22 as below are cases that shifter 1 is shifted from one state of P range selection, N range selection and D range selection at ND fixed point Nd to the other state.

Also, first barrier Si to fourth barrier S4 shown in FIGS. 5 to 22 are properly removed from straight path L according to each shifting state so that controller 3 controls and a movement of shifter 1 is possible within a predetermined range, but for the sake of avoiding a complexity of an explanations, all first barrier Si to fourth barrier S4 is shown as it is.

Figure 14:
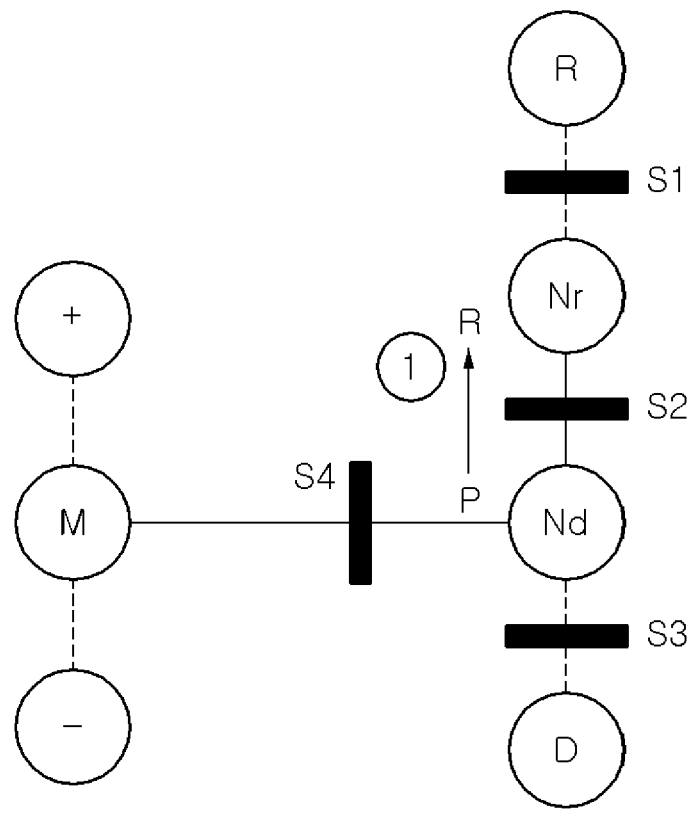
FIGS. 14 to 22 are a view showing cases that shifter is shifted from one state of a P range selection state, an N range selection state and a D range selection state at ND fixed point to the other state, respectively.

Referring to FIG. 14, controller 3 is constructed to judge as a R range shifting operation, with shifter 1 being in a state of P range selection at ND fixed point Nd, thereafter when receiving as a signal of sensor S that shifter 1 moves along a straight moving path shifted by user from ND fixed point Nd to NR fixed point Nr, and to output a signal of R range shifting.

Figure 15:
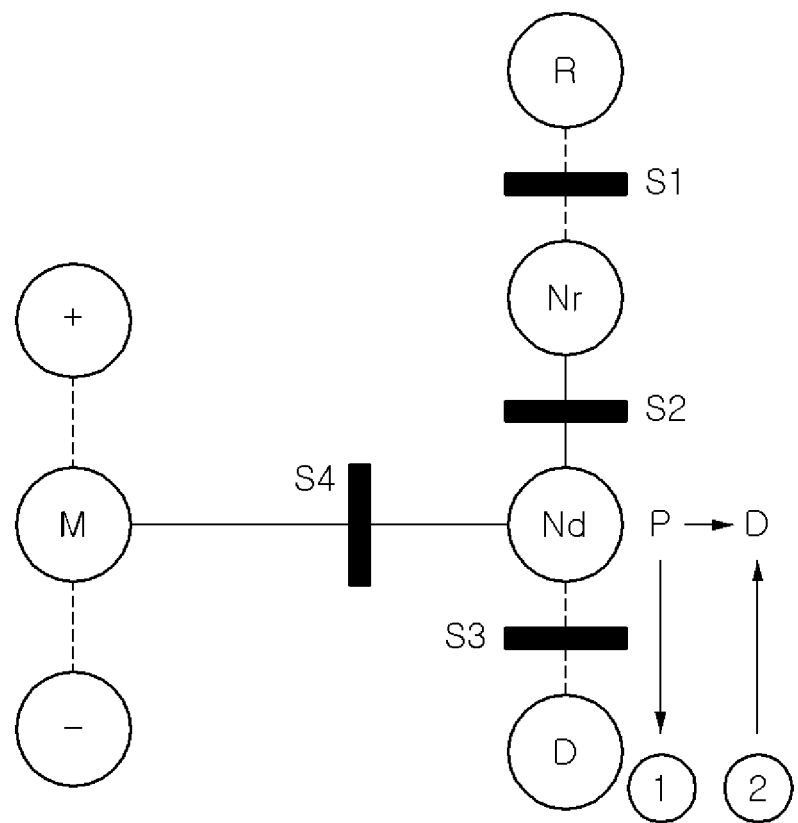

Referring to FIG. 15, controller 3 is constructed to judge as a D range shifting operation, with shifter 1 being in a state of P range selection at ND fixed point Nd, thereafter when receiving as a signal of sensor S that shifter 1 in turn moves along a straight moving path shifted by user from ND fixed point Nd to D temporary point D and a straight moving path returning to ND fixed point Nd automatically after user's external force being removed at D temporary point D, and to output a signal of D range shifting.

Figure 16:
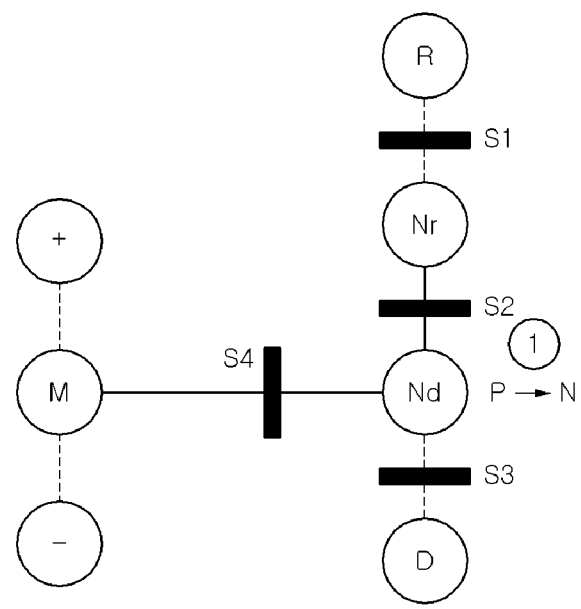

Referring to FIG. 16, controller 3 is constructed to judge as an N range shifting operation, with shifter 1 being in a state of P range selection at ND fixed point Nd, thereafter when receiving a signal of sensor S with respect to an operation of safety switch 7, to recognize as a state of N range selecting a state in which shifter 1 is maintained at ND fixed point Nd, and to output a signal of N range shifting.

Figure 17:
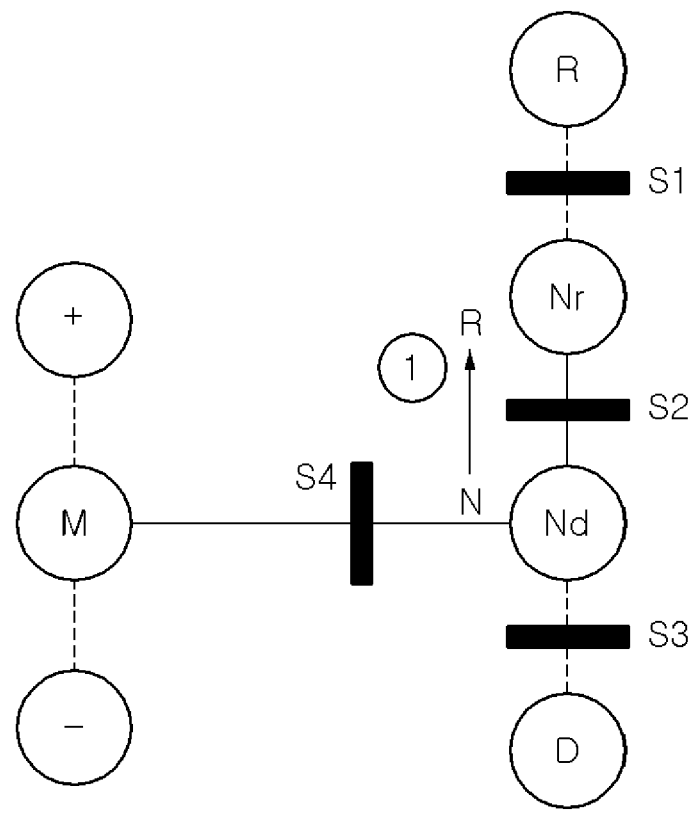

Referring to FIG. 17, controller 3 is constructed to judge as a R range shifting operation, with shifter 1 being in a state of N range selection at ND fixed point Nd, thereafter when receiving as a signal of sensor S that shifter 1 moves along a straight moving path shifted by user from ND fixed point Nd to NR fixed point Nr, and to output a signal of R range shifting.

Figure 18:
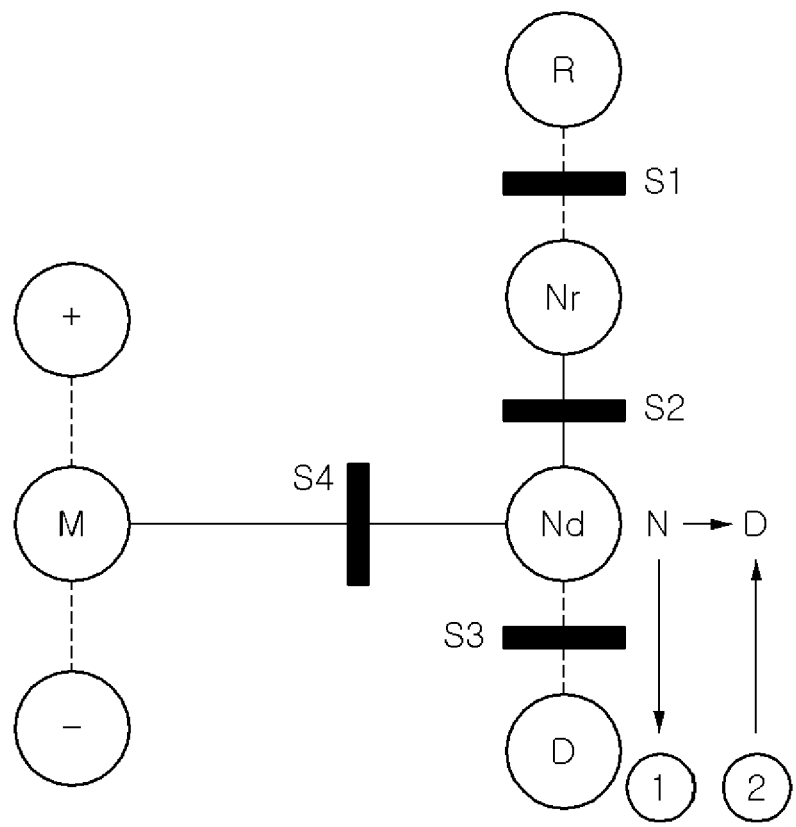

Referring to FIG. 18, controller 3 is constructed to judge as a D range shifting operation, with shifter 1 being in a state of N range selection at ND fixed point Nd, thereafter when receiving as a signal of sensor S that shifter 1 in turn moves along a straight moving path shifted by user from ND fixed point Nd to D temporary point D and a straight moving path returning to ND fixed point Nd automatically after user's external force being removed at D temporary point D, and to output a signal of D range shifting.

Figure 19:
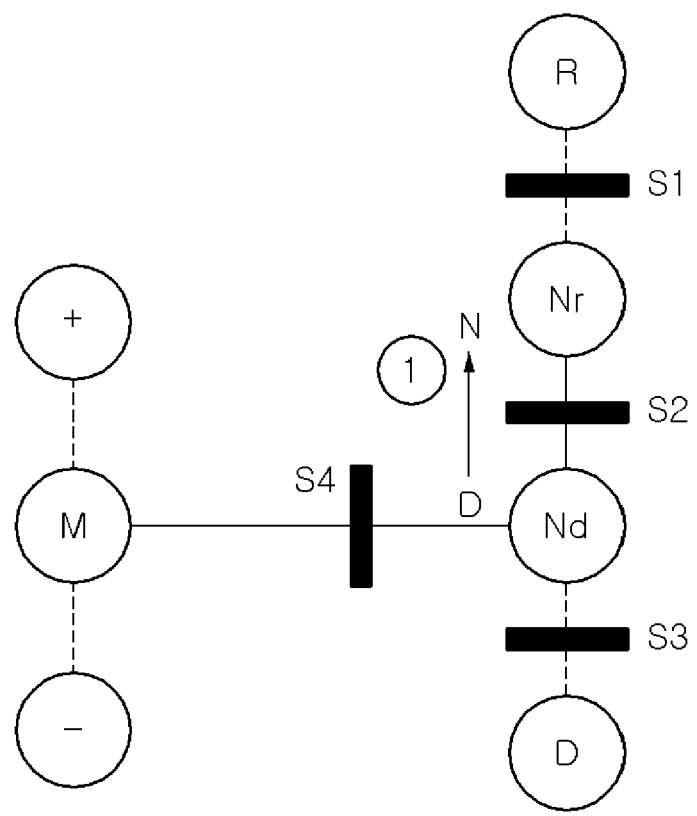

Referring to FIG. 19, controller 3 is constructed to judge as an N range shifting operation, with shifter 1 being in a state of D range selection at ND fixed point Nd, thereafter when receiving as a signal of sensor S that shifter 1 moves along a straight moving path shifted by user from ND fixed point Nd to NR fixed point Nr, and to output a signal of N range shifting.

Figure 20:
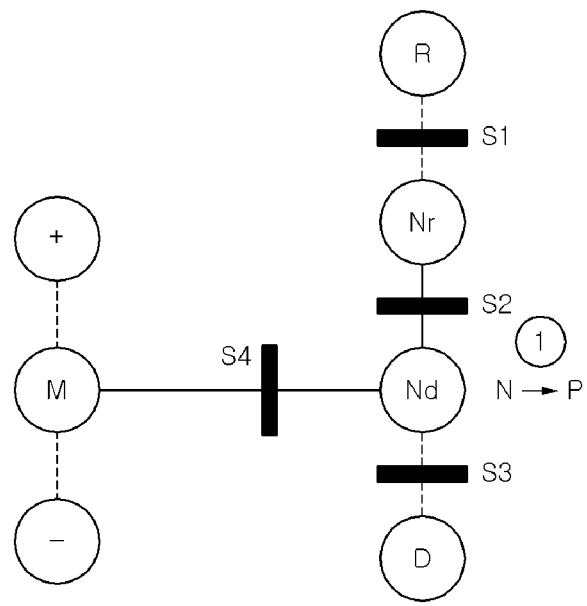

Referring to FIG. 20, controller 3 is constructed to judge as a P range shifting operation, with shifter 1 being in a state of N range selection at ND fixed point Nd, thereafter when receiving a signal of sensor S with respect to an operation of P actuator 5, to recognize as a state of P range selecting a state in which shifter 1 is maintained at ND fixed point Nd, and to output a signal of P range shifting.

Figure 21:
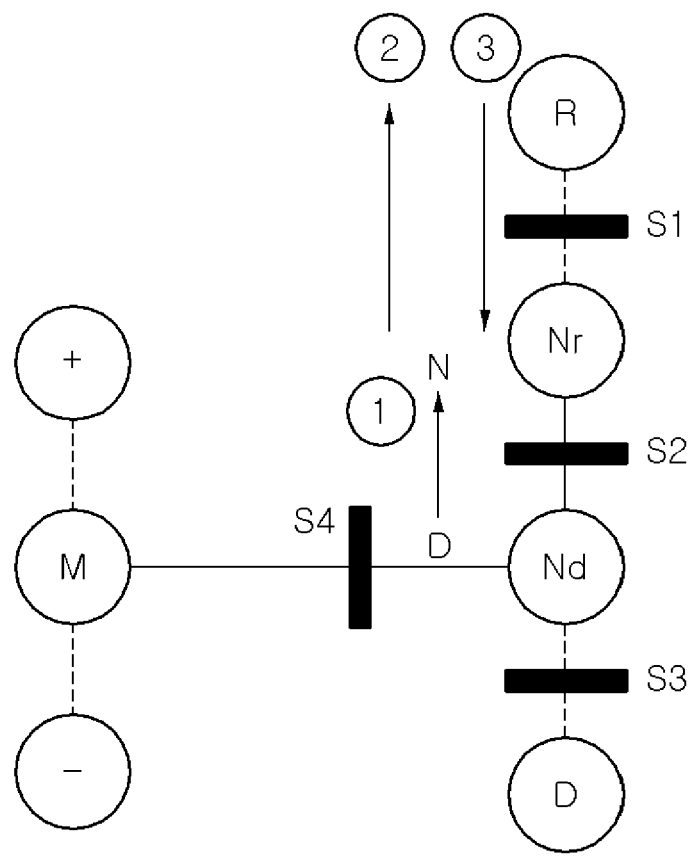

Referring to FIG. 21, controller 3 is constructed to judge as a R range shifting operation, with shifter 1 being in a state of D range selection at ND fixed point Nd, thereafter when receiving as a signal of sensor S that shifter 1 in turn moves along a straight moving path shifted by user from ND fixed point Nd to NR fixed point Nr, a straight moving path shifted by user from NR fixed point Nr to R temporary point R, and a straight moving path returning to NR fixed point Nr automatically after user's external force being removed at R temporary point R, and to output a signal of R range shifting.

Figure 22:
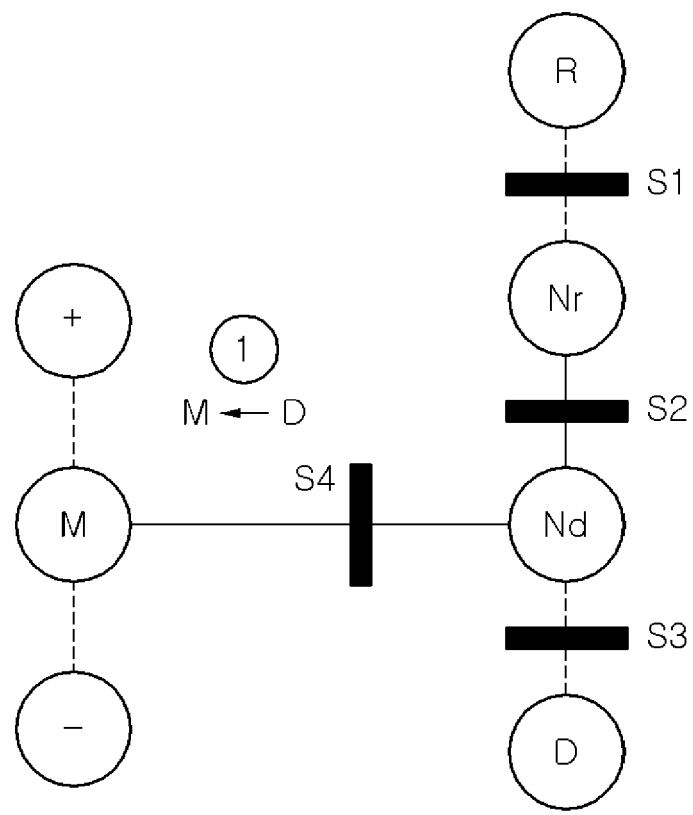

Referring to FIG. 22, controller 3 is constructed to judge as manual mode shifting operation, with shifter 1 being in a state of D range selection at ND fixed point Nd, thereafter when receiving as a signal of sensor S that shifter 1 in turn moves along a straight moving path shifted by user from ND fixed point Nd to M fixed point M, and a straight moving path shifted by user from M fixed point to a +temporary point or a − temporary point, and to output a signal of manual mode shifting operation accordingly.

That is, in order to move shifter 1 to M fixed point M for shifting to a manual mode, shifter 1 is adapted to necessarily go through a state of D range selection at ND fixed point Nd.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission shifting apparatus of a vehicle, comprising:
   a shifter movably installed along at least two straight paths which meet each other at one point, respectively;
      wherein at least two fixed points are arranged adjacent each other in at least one of straight paths, in which the shifter maintains a position thereof unless an external force is applied thereto;
      wherein the straight path having the at least two fixed points has a structure extending outward both sides of the at least two fixed points;
      wherein one of the at least two fixed points in the straight path is formed to meet the other straight path of the at least two straight paths;
      wherein the straight path having the at least two fixed points has temporary points in which the shifter is moved outwardly to both sides of the at least two fixed points by an external force respectively and automatically returned to one fixed point of the at least two fixed points, the one fixed point of the at least two fixed points being adjacent to the corresponding temporary point;
      wherein the at least two fixed points include a first fixed point and a second fixed point disposed in a first path, and a third fixed point disposed in a second path intersected with the first path;
      wherein the second path meets the first path at the second fixed point formed in the first path;
      wherein the second path meets a third path;
      wherein a point where the second path meets the third path is the third fixed point where the shifter maintains a position thereof unless an external force is applied;
      wherein both ends of the second path include the second fixed point and the third fixed point and the second fixed point and the third fixed point are arranged adjacent each other;
      wherein the third path has temporary points in which the shifter is moved to both opposite sides about the third fixed point by an external force along the third path and returned automatically to the third fixed point;

wherein a temporary point disposed outside the first fixed point and the second fixed point in the first path is an R temporary point for selecting an R range;

wherein a temporary point outside the second fixed point and the first fixed point in the first path in the opposite direction of the R temporary point is a D temporary point for selecting a D range;

wherein the first fixed point and the second fixed point are an NR fixed point and an ND fixed point for selecting an N range, respectively;

wherein the third fixed point is an M fixed point for selecting a neutral state of a manual mode; and wherein the temporary points disposed in both sides of the M fixed point in the third path are a +temporary point and a −temporary point;

a P actuator for selecting a P range by a separate operation when the shifter is located at the NR fixed point or the ND fixed point, wherein the P actuator includes a P shifting button provided in the shifter;

wherein the shifter further includes a safety switch for receiving a user's input separately except for moving the shifter; and wherein:
the NR fixed point and the ND fixed point are converted into a position of P range selection by an operation of the P actuator when the shifter is located at the NR fixed point or the ND fixed point, respectively;

having a state of the N or R range selection besides the P range when the shifter is located in the NR fixed point; and having a state of the N or D range selection besides the P range when the shifter is located in the NR fixed point.

2. The transmission shifting apparatus as defined in claim 1, wherein when user operates the P actuator with the shifter being in a state of the R range selection at the NR fixed point, the shifter is maintained at the NR fixed point.

3. The transmission shifting apparatus as defined in claim 1, wherein when user operates the P actuator with the shifter being in a state of the N range selection at the NR fixed point, the shifter is maintained at the NR fixed point.

4. The transmission shifting apparatus as defined in claim 1, wherein when the shifter is in a state of the P range selection at the NR fixed point, a moving path of the shifter for shifting to R range includes,
a straight moving path shifted by user from the NR fixed point to the R temporary point; and
a straight moving path returning to the NR fixed point automatically after user's external force is removed at the R temporary point.

5. The transmission shifting apparatus as defined in claim 4, wherein when the shifter is in a state of the P range selection at the NR fixed point, a moving path of the shifter for shifting to the D range includes,
a straight moving path shifted by user from the NR fixed point to the ND fixed point.

6. The transmission shifting apparatus as defined in claim 5, wherein when user operates the safety switch with the shifter being in a state of the P range selection at the NR fixed point, the shifter is converted into a state of the N range selection at the NR fixed point.

7. The transmission shifting apparatus as defined in claim 6, wherein when the shifter is in a state of the R range selection at the NR fixed point, a moving path of the shifter for shifting to the N range includes,
a straight moving path shifted by user from the NR fixed point to the ND fixed point.

8. The transmission shifting apparatus as defined in claim 7, wherein when the shifter is in a state of the R range selection at the NR fixed point, a moving path of the shifter for shifting to the D range includes,
a straight moving path shifted by user from the NR fixed point to the ND fixed point;
a straight moving path shifted by user from the ND fixed point to the D temporary point; and
a straight moving path returning to the ND fixed point automatically after user's external force is removed at the D temporary point.

9. The transmission shifting apparatus as defined in claim 7, wherein when the shifter is in a state of the N range selection at the NR fixed point, a moving path of the shifter for shifting to the R range includes,
a straight moving path shifted by user from the NR fixed point to the R temporary point; and
a straight moving path returning to the NR fixed point automatically after user's external force is removed at the R temporary point.

10. The transmission shifting apparatus as defined in claim 9, wherein when the shifter is in a state of the N range selection at the NR fixed point, a moving path of the shifter for shifting to the D range includes,
a straight moving path shifted by user from the NR fixed point to the ND fixed point;
a straight moving path shifted by user from the ND fixed point to the D temporary point; and
a straight moving path returning to the ND fixed point automatically after user's external force is removed at the D temporary point.

11. The transmission shifting apparatus as defined in claim 10, wherein when the shifter is in a state of the P range selection at the ND fixed point, a moving path of the shifter for shifting to the R range includes,
a straight moving path shifted by user from the ND fixed point to the NR fixed point.

12. The transmission shifting apparatus as defined in claim 11, wherein when the shifter is in a state of the P range selection at the ND fixed point, a moving path of the shifter for shifting to the D range includes,
a straight moving path shifted by user from the ND fixed point to the D temporary point; and
a straight moving path returning to the ND fixed point automatically after user's external force is removed at the D temporary point.

13. The transmission shifting apparatus as defined in claim 12, wherein when user operates the safety switch with the shifter being in a state of the P range selection at the ND fixed point, the shifter is converted into a state of the N range selection at the ND fixed point.

14. The transmission shifting apparatus as defined in claim 13, wherein when the shifter is in a state of the N range selection at the ND fixed point, a moving path of the shifter for shifting to the R range includes,
a straight moving path shifted by user from the ND fixed point to the NR fixed point.

15. The transmission shifting apparatus as defined in claim 14, wherein when the shifter is in a state of the N range selection at the ND fixed point, a moving path of the shifter for shifting to the D range includes,
a straight moving path shifted by user from the ND fixed point to the D temporary point; and a straight moving path returning to the ND fixed point automatically after user's external force is removed at the D temporary point.

16. The transmission shifting apparatus as defined in claim 15, wherein when the shifter is in a state of the D range selection at the ND fixed point, a moving path of the shifter for shifting to the N range includes,
a straight moving path shifted by user from the ND fixed point to the NR fixed point.

17. The transmission shifting apparatus as defined in claim 15, wherein when user operates the P actuator with the shifter being in a state of the N range selection at the ND fixed point, the shifter is converted into a state of the P range selection at the ND fixed point.

18. The transmission shifting apparatus as defined in claim 17, wherein when the shifter is in a state of the D range selection at the ND fixed point, a moving path of the shifter for shifting to the R range includes,
a straight moving path shifted by user from the ND fixed point to the NR fixed point;
a straight moving path shifted by user from the NR fixed point to the R temporary point; and
a straight moving path returning to the NR fixed point automatically after user's external force is removed at the R temporary point.

19. The transmission shifting apparatus as defined in claim 18, wherein when the shifter is in a state of the D range selection at the ND fixed point, a moving path of the shifter for manual mode operation range includes,
a straight moving path shifted by user from the ND fixed point to the M fixed point; and
a straight moving path shifted by user from the M fixed point to a +temporary point or a −temporary point.

20. A transmission shifting apparatus of a vehicle, comprising:
a shifter movably installed along at least two straight paths which meet at one point each other, respectively;
a sensor for sensing a changing location of the shifter moved along the at least two straight paths; and
a controller for receiving an input of the sensor and outputting a shifting signal which control a transmission according to the changing operation of shifter,
wherein at least two fixed points are arranged adjacent each other in at least one of straight paths, in which shifter maintains a position thereof unless an external force is applied thereto;
wherein the straight path having the at least two fixed points has a structure extending outward both sides of the at least two fixed points;
wherein one of the at least two fixed points in the straight path is formed to meet the other straight path of the at least two straight paths;
wherein the straight path having the at least two fixed points has temporary points in which the shifter moves outward both sides of the at least two fixed points by an external force respectively, and automatically return to one fixed point of the two fixed points, the one fixed point of the two fixed points being adjacent to the corresponding temporary point;
wherein the at least two fixed points include a first fixed point and a second fixed point disposed in a first path and a third fixed point disposed in a second path intersected with the first path;
wherein the second path meets the first path at the second fixed point formed in the first path;
wherein the second path meets a third path;
wherein a point where the second path meets the third path is the third fixed point where the shifter maintains a position thereof unless an external force is applied;
wherein both ends of the second path include the second fixed point and the third fixed point and the second fixed point and the third fixed point are arranged adjacent each other;
wherein the third path has temporary points in which the shifter is moved to both opposite sides about the third fixed point by an external force along the third path and returned automatically to the third fixed point;
wherein a temporary point disposed outside the first fixed point and the second fixed point in the first path is a R temporary point for selecting a R range;
wherein a temporary point outside the second fixed point and the first fixed point in the first path in the opposite direction of the R temporary point is a D temporary point for selecting a D range;
wherein the first fixed point and the second fixed point are an NR fixed point and an ND fixed point for selecting an N range, respectively;
wherein the third fixed point is an M fixed point for selecting a neutral state of a manual mode; and
wherein the temporary points disposed in both sides of the M fixed point in the third path are a +temporary point and a −temporary point; and
a P actuator for selecting a P range by a separate operation when the shifter is located at the NR fixed point or the ND fixed point;
wherein the controller is constructed to receive a signal according to an operation of the shifter;
wherein a first barrier, a second barrier, a third barrier and a fourth barrier are provided between the R temporary point and the NR fixed point, between the NR fixed point and the ND fixed point, between the ND fixed point and the D temporary point, and between the ND fixed point and the M fixed point, respectively;
wherein the controller is constructed to selectively control the first barrier, the second barrier, the third barrier and the fourth barrier;
wherein the shifter further includes a safety switch for receiving a user's input separately except for moving the shifter;
wherein the controller is constructed to receive a signal of the user's input according to an operation of the safety switch;
wherein the controller is constructed
to judge that both a state in which the shifter is located at the NR fixed point and a state in which the shifter is located at the ND fixed point are in a state of a P range selection, respectively, and then to output a shifting signal of a P range, when the controller receives a signal by an operation of the P actuator with the shifter being located at the NR fixed point or the ND fixed point;
to recognize that a state in which the shifter is located at the NR fixed point is a state of the N or R range selection besides the P range; and
to recognize that a state in which the shifter is located at the ND fixed point is a state of the N or D range selection besides the P range;
wherein the controller is constructed to judge as an R range shifting operation, with the shifter being in a state of the P range selection at the NR fixed point, thereafter when receiving as a signal of the sensor that the shifter in turn moves along a straight moving path shifted by user from the NR fixed point to the R temporary point and a straight moving path returning to the NR fixed point automatically after user's external force is removed at the R temporary point, and to output a signal of R range shifting; and wherein the controller is constructed to judge as a D range shifting operation, with the shifter being in a state of P range selection at the NR fixed point, thereafter when receiving as a signal of the sensor that the shifter moves along a straight moving path shifted by user from the NR fixed point to the ND fixed point, and to output a signal of D range shifting.

21. The transmission shifting apparatus as defined in claim 20, wherein the controller is constructed to judge as an N range shifting operation, with the shifter being in a state of P range selection at the NR fixed point, thereafter when receiving as a signal of the sensor that the safety switch is operated, to recognize as an N range shifting selection that the shifter is maintained at the NR fixed point, and to output a signal of N range shifting.

22. The transmission shifting apparatus as defined in claim 21, wherein the controller is constructed to judge as an N range shifting operation, with the shifter being in a state of R range selection at the NR fixed point, thereafter when receiving as a signal of the sensor that the shifter moves along a straight moving path shifted by user from the NR fixed point to the ND fixed point, and to output a signal of N range shifting.

23. The transmission shifting apparatus as defined in claim 22, wherein the controller is constructed to judge as a D range shifting operation, with the shifter being in a state of R range selection at the NR fixed point, thereafter when receiving as a signal of the sensor that the shifter in turn moves along a straight moving path shifted by user from the NR fixed point to the ND fixed point, a straight moving path shifted by user from the ND fixed point to the D temporary point, and a straight moving path returning to the ND fixed point automatically after user's external force is removed at the D temporary point, and to output a signal of D range shifting.

24. The transmission shifting apparatus as defined in claim 23, wherein the controller is constructed to judge as an R range shifting operation, with the shifter being in a state of N range selection at the NR fixed point, thereafter when receiving as a signal of the sensor that the shifter in turn moves along a straight moving path shifted by user from the NR fixed point to the R temporary point and a straight moving path returning to the NR fixed point automatically after user's external force is removed at the R temporary point, and to output a signal of R range shifting.

25. The transmission shifting apparatus as defined in claim 24, wherein the controller is constructed to judge as a P range shifting operation, with the shifter being in a state of R range selection at the NR the fixed point, thereafter when receiving a signal of the sensor with respect to an operation of the P actuator, to recognize as a state of P range selecting a state in which the shifter is maintained at the NR fixed point, and to output a signal of P range shifting.

26. The transmission shifting apparatus as defined in claim 25, wherein the controller is constructed to judge as a D range shifting operation, with the shifter being in a state of N range selection at the NR fixed point, thereafter when receiving as a signal of the sensor that the shifter in turn moves along a straight moving path shifted by user from the NR fixed point to the ND fixed point, a straight moving path shifted by user from the ND fixed point to D temporary point, and a straight moving path returning to ND fixed point automatically after user's external force is removed at the D temporary point, and to output a signal of D range shifting.

27. The transmission shifting apparatus as defined in claim 26, wherein controller is constructed to judge as a P range shifting operation, with the shifter being in a state of N range selection at the NR fixed point, thereafter when receiving a signal of the sensor with respect to an operation of the P actuator, to recognize as a state of P range selecting a state in which the shifter is maintained at the NR fixed point, and to output a signal of P range shifting.

28. The transmission shifting apparatus as defined in claim 27, wherein the controller is constructed to judge as an R range shifting operation, with the shifter being in a state of P range selection at the ND fixed point, thereafter when receiving as a signal of the sensor that the shifter moves along a straight moving path shifted by user from the ND fixed point to the NR fixed point, and to output a signal of R range shifting.

29. The transmission shifting apparatus as defined in claim 28, wherein the controller is constructed to judge as a D range shifting operation, with the shifter being in a state of P range selection at the ND fixed point, thereafter when receiving as a signal of the sensor that the shifter in turn moves along a straight moving path shifted by user from the ND fixed point to the D temporary point and a straight moving path returning to the ND fixed point automatically after user's external force is removed at the D temporary point, and to output a signal of D range shifting.

30. The transmission shifting apparatus as defined in claim 29, wherein the controller is constructed to judge as an N range shifting operation, with the shifter being in a state of P range selection at the ND fixed point, thereafter when receiving a signal of the sensor with respect to an operation of the safety switch, to recognize as a state of N range selecting a state in which the shifter is maintained at the ND fixed point, and to output a signal of N range shifting.

31. The transmission shifting apparatus as defined in claim 30, wherein the controller is constructed to judge as an R range shifting operation, with the shifter being in a state of N range selection at the ND fixed point, thereafter when receiving as a signal of the sensor that the shifter moves along a straight moving path shifted by user from the ND fixed point to the NR fixed point, and to output a signal of R range shifting.

32. The transmission shifting apparatus as defined in claim 31, wherein the controller is constructed to judge as a D range shifting operation, with the shifter being in a state of N range selection at the ND fixed point, thereafter when receiving as a signal of the sensor that the shifter in turn moves along a straight moving path shifted by user from the ND fixed point to the D temporary point and a straight moving path returning to the ND fixed point automatically after user's external force is removed at the D temporary point, and to output a signal of D range shifting.

33. The transmission shifting apparatus as defined in claim 32, wherein the controller is constructed to judge as an N range shifting operation, with the shifter being in a state of D range selection at the ND fixed point, thereafter when receiving as a signal of the sensor that the shifter moves along a straight moving path shifted by user from the ND fixed point to the NR fixed point, and to output a signal of N range shifting.

34. The transmission shifting apparatus as defined in claim 33, wherein the controller is constructed to judge as a P range shifting operation, with the shifter being in a state of N range selection at the ND fixed point, thereafter when receiving a signal of the sensor with respect to an operation of the P actuator, to recognize as a state of P range selecting a state in which the shifter is maintained at the ND fixed point, and to output a signal of P range shifting.

35. The transmission shifting apparatus as defined in claim 34, wherein the controller is constructed to judge as an R range shifting operation, with the shifter being in a state of D range selection at the ND fixed point, thereafter when receiving as a signal of the sensor that the shifter in turn moves along a straight moving path shifted by user from the ND fixed point to the NR fixed point, a straight moving path shifted by user from the NR fixed point to the R temporary point, and a straight moving path returning to the NR fixed point automatically after user's external force is removed at the R temporary point, and to output a signal of R range shifting.

36. The transmission shifting apparatus as defined in claim 35, wherein the controller is constructed to judge as a manual mode shifting operation, with the shifter being in a state of D range selection at the ND fixed point, thereafter when receiving as a signal of the sensor that the shifter in turn moves along a straight moving path shifted by user from the ND fixed point to the M fixed point M, and a straight moving path shifted by user from the M fixed point to a +temporary point or a −temporary point, and to output a signal of manual mode shifting operation accordingly.

* * * * *